United States Patent
Wangenborn et al.

(10) Patent No.: US 11,554,663 B2
(45) Date of Patent: Jan. 17, 2023

(54) WHEEL HUB DRIVE SYSTEM

(71) Applicant: Volvo Construction Equipment AB, Eskilstuna (SE)

(72) Inventors: Carl Fredrik Wangenborn, Eskilstuna (SE); Arto Honkanen, Eskilstuna (SE); Thomas Andersson, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 71 days.

(21) Appl. No.: 17/274,916

(22) PCT Filed: Sep. 11, 2018

(86) PCT No.: PCT/EP2018/074416
§ 371 (c)(1),
(2) Date: Mar. 10, 2021

(87) PCT Pub. No.: WO2020/052734
PCT Pub. Date: Mar. 19, 2020

(65) Prior Publication Data
US 2022/0048381 A1    Feb. 17, 2022

(51) Int. Cl.
*B60K 17/04* (2006.01)
*B60K 7/00* (2006.01)

(52) U.S. Cl.
CPC .......... *B60K 17/046* (2013.01); *B60K 7/0007* (2013.01); *B60K 2007/0038* (2013.01); *B60K 2007/0092* (2013.01)

(58) Field of Classification Search
CPC .............................. B60K 17/046; B60K 7/0007
See application file for complete search history.

(56) References Cited

U.S. PATENT DOCUMENTS

| | | | |
|---|---|---|---|
| 5,813,488 A | * | 9/1998 | Weiss .................. B60K 7/0007 180/65.6 |
| 2006/0191168 A1 | * | 8/2006 | Casey .................. B60K 17/34 37/348 |

(Continued)

FOREIGN PATENT DOCUMENTS

| | | |
|---|---|---|
| DE | 102011005621 A1 | 9/2012 |
| EP | 0812718 A2 | 12/1997 |
| GB | 2156475 A | 10/1985 |

OTHER PUBLICATIONS

International Search Report and Written Opinion of the International Searching Authority, PCT/EP2018/074416, dated Dec. 13, 2018, 10 pages.

*Primary Examiner* — Erez Gurari
(74) *Attorney, Agent, or Firm* — Sage Patent Group

(57) ABSTRACT

A wheel hub drive system includes a drive motor with a drive shaft, an input planetary gear set (PGS), an output PGS and an intermediate PGS. Each PGS includes a sun gear, a planet carrier and planet gears provided upon the planet carrier. The drive shaft is rotationally fixed with the sun gear of the input PGS. The planet carrier of the input PGS is rotationally fixed with the sun gear of the intermediate PGS, and the planet carrier of the intermediate PGS is rotationally fixed with the sun gear of the output PGS. The planet carrier of the output PGS is adapted to be rotationally fixed with a rim of a wheel. The output PGS is provided axially in-between the input PGS and the intermediate PGS.

12 Claims, 2 Drawing Sheets

(56) References Cited

U.S. PATENT DOCUMENTS

| | | | |
|---|---|---|---|
| 2010/0206649 A1* | 8/2010 | Ishii | B60K 7/0015 |
| | | | 310/156.35 |
| 2014/0139009 A1* | 5/2014 | Bindl | B60K 7/0007 |
| | | | 301/6.5 |
| 2016/0263987 A1* | 9/2016 | Brownell | B60K 17/046 |
| 2018/0312058 A1* | 11/2018 | Isono | F16H 37/041 |
| 2019/0101200 A1* | 4/2019 | Linton | B60W 10/08 |
| 2020/0055391 A1* | 2/2020 | Kumar | B60K 1/02 |
| 2020/0384848 A1* | 12/2020 | Matsuda | H02K 7/006 |
| 2021/0254686 A1* | 8/2021 | Engerman | F16H 48/06 |
| 2021/0347253 A1* | 11/2021 | Seemann | B60K 1/02 |

* cited by examiner

WHEEL HUB DRIVE SYSTEM

CROSS REFERENCE TO RELATED APPLICATIONS

This application is a 35 U.S.C. § 371 national stage application of PCT International Application No. PCT/EP2018/074416 filed on Sep. 11, 2018, the disclosure and content of which is incorporated by reference herein in its entirety.

TECHNICAL FIELD

The invention relates to a wheel hub drive system for a wheel of a vehicle. The present invention also relates to a wheel and a vehicle provided with such a wheel hub drive system.

The invention is applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders or even on other vehicles such as trucks, buses and personal cars.

BACKGROUND

A planetary gear arrangement is often used in a vehicle wheel hub drive system for providing a speed reduction between the driven wheel a drive unit, typically an electric motor. In a wheel hub drive unit there is normally very restricted space available for the components of wheel drive unit. It is therefore desirable to construct a wheel hub drive unit that is as compact both in axial and radial direction as possible. In US 2016/0263987 a driven wheel unit is disclosed, which is designed to be as axially compact as possible, whereby the driven wheel unit instead becomes larger in radial direction, due to two clutches arranged on a radial outside of one of the planetary gear sets.

In applications with less radial space, the wheel hub drive unit of US 2016/0263987 is therefor less suitable. For example a mid-sized to large wheel loader is normally provided with 25" wheels, in which there is less radial space available.

SUMMARY

An object of the invention is to provide a wheel hub drive system for a wheel of a vehicle enabling a compact packing of the part of the wheel hub drive system in both radial and axial directions. One object of the invention also concerns a wheel provided with a compact wheel hub drive system and another object of the invention concerns a vehicle provided with the compact wheel hub drive system.

According to a first aspect, the present invention at least partly solves the above-identified and other objectives by providing a wheel hub drive system according the subject matter of claim 1.

The wheel hub drive system at least comprises a drive motor with a drive shaft, an input planetary gear set, an output planetary gear set and an intermediate planetary gear set. Each planetary gear set comprises a sun gear, a planet carrier and planet gears provided upon the planet carrier. The drive shaft of the motor is arranged rotationally fixed with the sun gear of the input planetary gear set. The planetary gear sets are arranged such that the planet carrier of the input planetary gear set is arranged rotationally fixed with the sun gear of the intermediate planetary gear set. The planet carrier of the intermediate planetary gear set is arranged rotationally fixed with the sun gear of the output planetary gear set. The planet carrier of the output planetary gear set is adapted to be arranged rotationally fixed with a rim of the wheel. The planetary gear sets are axially arranged in relation to each other such that the output planetary gear set is provided axially in-between the input planetary gear set and the intermediate planetary gear set.

An exemplary effect of the axial arrangement of the drive motor adjacent to the input planetary gear set, which is adjacent to the output planetary gear set, which is adjacent to the intermediate planetary gear set, is that it enables to place both a wheel bearing and a brake axially directly in-between the input planetary gear set and the output planetary gear set with maintained axial and radial compactness. The space between the input planetary gear set and the output planetary gear set is close to the axial centre of the wheel hub drive system. To place the wheel bearing close to the axial centre of the wheel hub drive system is beneficial since there will be less axial forces in the bearing, whereby a smaller bearing can be used in comparison to if the wheel bearing needs to be arranged with a larger offset to the axial centre of the wheel.

In one exemplary embodiment of the wheel hub drive system it further comprises a brake. The brake comprises a first part and a second part, where the first part is rotationally fixed with a stationary part of the wheel hub drive system and the second part is rotationally fixed with the sun gear of the output planetary gear set. The first part and the second part can be controllable engaged such that they are rotationally fixed to each other. The brake can thereby be set in an engaged and a disengaged stated. In the engaged state of the brake the sun gear of the output planetary gear set is rotationally fixed with the stationary part of the wheel hub drive system. In the disengaged state of the brake the sun gear of the output planetary gear does not have any rotationally fixed connection to any stationary part of the wheel hub drive system. An exemplary effect of providing the brake to brake the sun gear of the output planetary gear set in its engaged state, is that it enables a placement of the brake axially between the input planetary gear set and the output planetary gear set.

A stationary part is a part that is stationary in relation to the rotor of the electric motor of the wheel hub drive system. A stationary part of the wheel hub drive system can thereby be the stator of the electrical motor or any part fixedly connected to the stator of the electrical motor.

In one exemplary embodiment of the wheel hub drive system the brake is provided axially in-between the input planetary gear set and the output planetary gear set. An exemplary effect of providing the brake axially in-between the input planetary gear set and the output planetary gear set is that it still leaves space for providing a wheel bearing axially in-between the input planetary gear set and the output planetary gear set, without any significant effect of the radial building space.

In one exemplary embodiment the wheel hub drive system further comprises at least an inner ring of a wheel bearing, wherein the inner ring is arranged radially outside the brake and upon a stationary part of the hub drive system. An exemplary effect of the exemplary arrangement of the inner ring of the wheel bearing is that the radial narrow space inside the inner ring of the wheel bearing, can be used to host the brake. This allows the inner ring of the wheel bearing to have a relative small radius, in comparison to if a planetary gear set would be arranged inside the inner ring instead. The small radius contributes to keeping the whole wheel hub drive system radially compact. The radial arrangement of the brake inside the inner ring contributes to keeping the whole wheel hub drive system axially compact.

In one exemplary embodiment the wheel hub drive system further comprises an outer ring of the wheel bearing, and the outer ring is adapted to be rotationally fixed to a rim of the wheel. An exemplary effect of this is that the wheel hub drive system thereby is already provided with the wheel bearing and can be easily fitted to a rim of a wheel.

In one exemplary embodiment of the wheel hub drive system, the intermediate planetary gear set further comprises a ring gear and the ring gear of the intermediate planetary gear set is rotationally fixed with the planet carrier of the output planetary gear set. An exemplary effect of providing a ring gear adapted to be rotationally fixed with the planet carrier of the output planetary gear set is that also the ring gear of the intermediate planetary gear set will deliver drive torque to the rim of the wheel, when the wheel hub drive system is arranged in a wheel of a vehicle.

In one exemplary embodiment of the wheel hub drive system, the output planetary gear set further comprises a ring gear and the ring gear of the output planetary gear set is rotationally fixed with a stationary part of the wheel hub drive system. An exemplary effect of this configuration is that the larges possible gear ratio is achieved from the planetary gear set.

In one exemplary embodiment of the wheel hub drive system, the input planetary gear set further comprises a ring gear and the ring gear of the input planetary gear set is rotationally fixed with a stationary part of the wheel hub drive system. An exemplary effect of this configuration is that the largest possible gear ratio is achieved from the planetary gear set.

In one exemplary embodiment the wheel hub drive system further comprises at least one extension shaft coaxially arranged with the drive shaft of the motor, wherein the sun gear of the intermediate planetary gear set is provided on the extension shaft. An exemplary effect of the extension shaft is that it connects the planet carrier of the input planetary gear set and the sun gear of the intermediate planetary gear set.

In one exemplary embodiment the wheel hub drive system further comprises at least one hollow shaft coaxially arranged with the drive shaft of the motor, and provided around the extension shaft, wherein the sun gear of the output planetary gear set is provided upon the hollow shaft. An exemplary effect of providing the hollow shaft about the extension shaft is that it enables an arrangement of the output planetary gear set in-between the input planetary gear set and the intermediate planetary gear set.

One aspect of this disclosure concerns a wheel provided with a wheel hub drive system according to any relevant embodiment thereof, wherein the wheel comprises a rim and the rim is rotationally fixed with at least the planet carrier of the output planetary gear set. An exemplary effect of such a wheel is that it is provided with an integrated drive system that fits within the dimensions of a standard rim for relevant applications, such as wheel loaders and other construction equipment.

One aspect of this disclosure concerns a vehicle that comprises a wheel, which comprises a wheel hub drive system according to any relevant embodiment thereof. An exemplary effect of such a vehicle is that it is provided with an integrated drive system in at least one wheel, which can be of standard dimensions.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
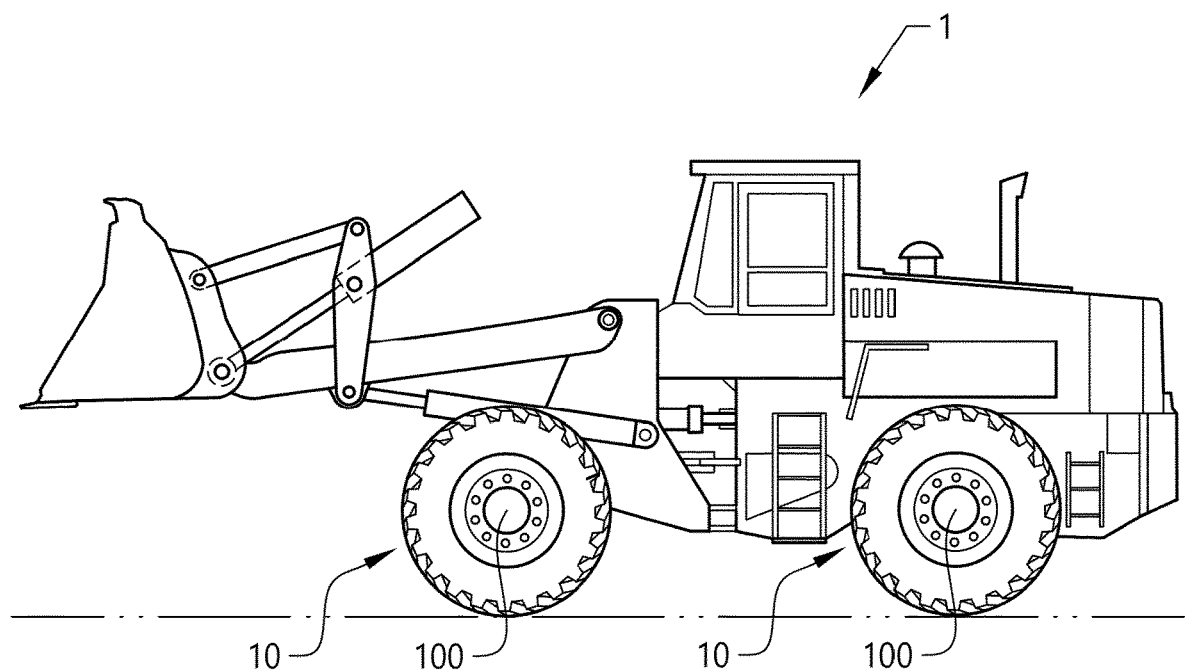
FIG. 1 is a schematic sideview of a wheel loader being provided with a wheel hub drive system according to one aspect of the present disclosure.

The present invention will now be described more fully hereinafter with reference to the accompanying drawings, in which exemplary embodiments of the invention are shown. The invention may, however, be embodied in many different forms and should not be construed as limited to the embodiments described above and illustrated in the drawings; rather, these embodiments are provided for thoroughness and completeness, and fully convey the scope of the invention to the skilled addressee. Like reference characters refer to like elements throughout the description.

FIG. 1 discloses a wheel loader 1, provided with wheels 10. In the wheel hub of the wheels 10 are wheel hub drive systems 100 arranged. The wheel hub drive system 100 provides a drive force to the wheel 10. The wheel loader 1 is an example of a vehicle in which a wheel hub drive system 100 according to the present disclosure is suitable. The wheel hub drive system 100 is especially suitable to be used in application provided with 25" wheel sizes, such as mid-sized constructional equipment, e.g. wheel loaders, articulated haulers, excavators and backhoe loaders.

Figure 2:
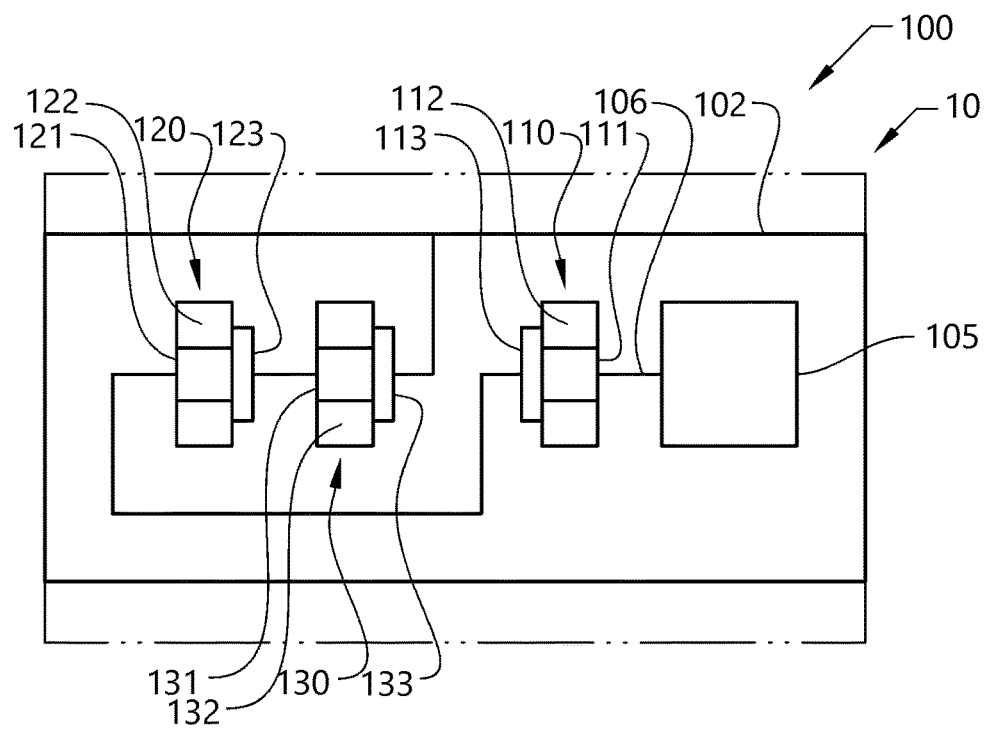
FIG. 2 is a schematic drawing of an embodiment of the wheel hub drive system of the present disclosure.

FIG. 2 schematically discloses the basic concept of the wheel hub drive system 100 according to this disclosure. The wheel hub drive system 100 is provided in a rim 102 of a wheel 10 and comprises a drive motor 105 and three planetary gear sets 110, 120, 130, in the following also referred to as the input planetary gear set 110, the intermediate planetary gear set 120 and the output planetary gear set 130, respectively. The planetary gear sets 110, 120, 130 are all coaxially arranged with a drive shaft 106 of the motor 105. The motor is typically an electric motor. The sun gears 111, 121, 131 are centrally arranged in the planetary gear sets 110, 120, 130. Each planetary gear set 110, 120, 130 comprises a centrally arranged sun gear 111, 121, 131, a planet carrier 113, 123, 133 and planetary gears 112, 122, 132. The planetary gears 112, 122, 132 are arranged upon the planet carrier and evenly distributed circumferentially around and meshing with the sun gears 111, 121, 131.

In FIG. 2 especially the torque path from the drive motor 105 to the input planetary gear set 110 to the intermediate planetary gear set 120 and to the output planetary gear set 130 is disclosed and should be compared to the axial arrangement of the planetary gears. The torque path through the planetary gear sets 110, 120, 130 is different than the axial order of the planetary gear sets 110, 120, 130. The axial order differs from the torque path in that the output planetary gear set 130 is axially arranged in-between the input planetary gear set 110 and the intermediate planetary gear set 120, wherein in the torque path the input planetary gear set 110 is connected to the intermediate planetary gear set 120, which is connected to the output planetary gear set 130. The advantage with this configuration and the more details of the configuration will be described in the more detailed FIG. 3. The output planetary gear set 130 is arranged to be connected to a rim of a wheel 10.

Figure 3:
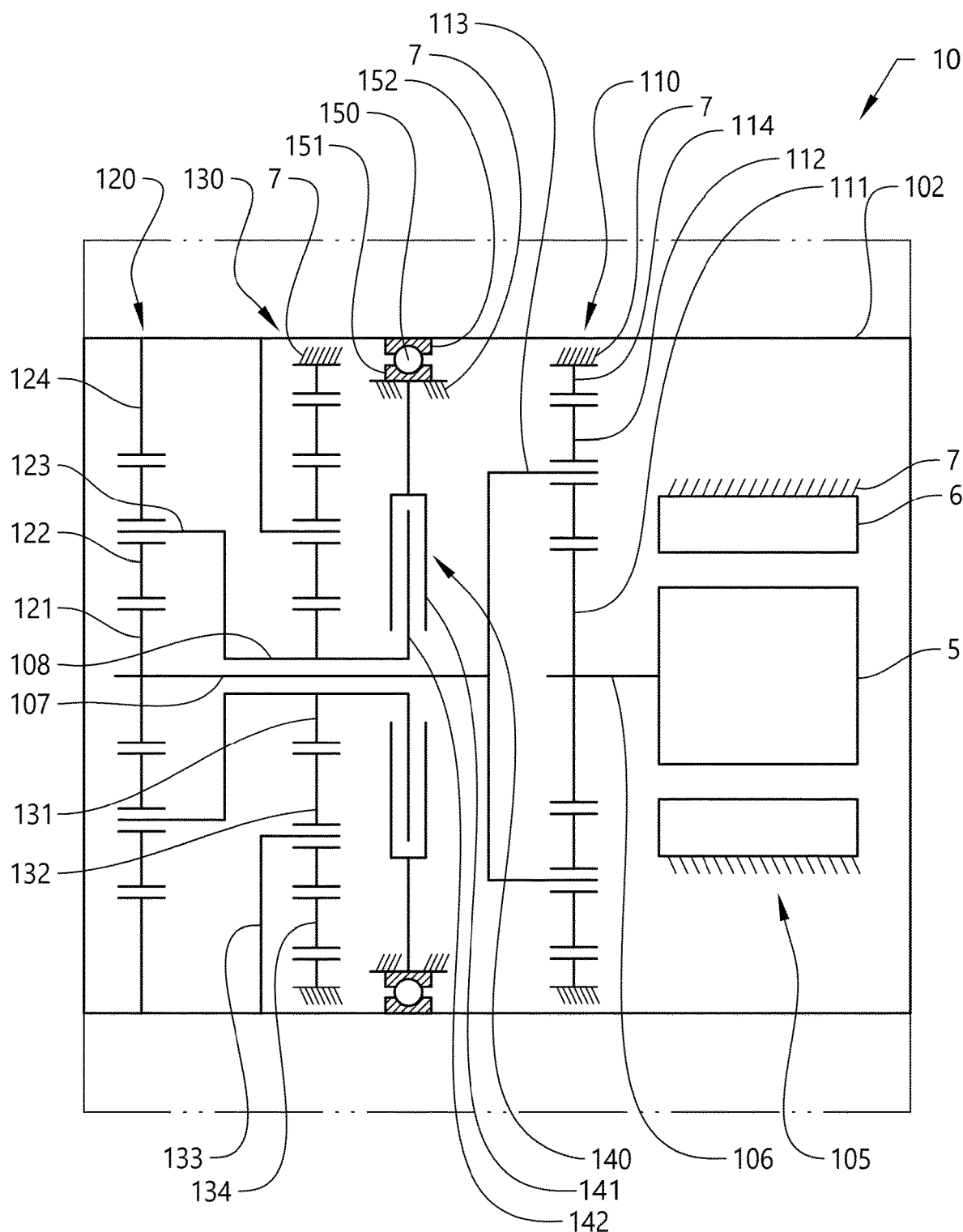
FIG. 3 is a schematic drawing of an embodiment of the wheel hub drive system of the present disclosure.

FIG. 3 schematically discloses a wheel hub drive system 100 provided in the rim 102 of a wheel 10 and comprises a drive motor 105 and three planetary gear sets 110, 120, 130. The planetary gear sets 110, 120, 130 are all coaxially arranged with a drive shaft 106 of the motor 105. The sun gears 111, 121, 131 are centrally arranged in the planetary gear sets 110, 120, 130. Each planetary gear set 110, 120, 130 comprises a centrally arranged sun gear 111, 121, 131, a planet carrier 113, 123, 133 provided with planetary gears 112, 122, 132 and a ring gear 114, 124, 134. The planetary gears 112, 122, 132 are arranged upon the planet carrier and evenly distributed circumferentially around and meshing with the sun gears 111, 121, 131. In the disclosed example the motor 105 is an electric motor with a rotor 5 and a stator 6. The stator 6 defines a stationary part 7 of the wheel hub drive system 100. Parts 7 of the wheel hub drive system 100 that is defined as stationary are thereby stationary and fixed in relation to the stator 6 of the drive motor 105.

The sun gear 111 of the input planetary gear 110 is rotationally fixed to the drive shaft 106 of the drive motor 105. The planet carrier 113 of the input planetary gear 110 is rotationally fixed to the sun gear 121 of the intermediate planetary gear 120 via an extension shaft 107, which is coaxially arranged with the drive shaft 106 of the drive motor 105. The ring gear 114 of the input planetary gear set 110 is rotationally fixed to a stationary part 7 of the wheel hub drive system 100.

The planet carrier 123 of the intermediate planetary gear set 120 is rotationally fixed to the sun gear 131 of the output planetary gear 130 via a hollow shaft 108, which is arranged about and coaxial with the extension shaft 107. The ring gear 124 of the intermediate planetary gear set 120 is rotationally fixed to the rim 102 of the wheel 10.

The sun gear 131 of the output planetary gear 130 is additionally connected to a brake 140 provided axially in-between the input planetary gear set 110 and the output planetary gear set 130. An exemplary effect of connecting the brake to the sun wheel 131 of the output planetary gears 130 to the brake 140 is that we get a torque amplification due to the gear ratio between the sun wheel 131 and the planet carrier 133, whereby a smaller brake 140 with smaller and/or fewer brake discs can be used. This also contributes to the possibility to arranged the brake 140 radially inside the inner ring 151 of the wheel bearing 150.

Hence, both the ring gear 124 of the intermediate planetary gear set 120 and the planet carrier 133 of the output planetary gear set 130 are connected to the rim 102 of the wheel. However, it is the planet carrier 133 of the output planetary gear set 130 that drives the wheel (10). The torque transmitted to the rim 102 from the ring gear 124 of the intermediate planetary gear set 120 is actually opposite directed towards the torque transmitted to rim 102 from the planet carrier 133 of the output planetary gear set 130, whereby the ring gear 124 of the intermediate planetary gear set 120 is supported by the torque transmitted from the planet carrier 133 of the output planetary gear set 130. The torque from the ring gear 124 of the intermediate planetary gear set 130 is however significantly lower than the torque from the planet carrier 133 of the output planetary gear set 130. An exemplary effect of this is that it is possible to build a more axially compact housing not reaching out to the intermediate planetary gear set 120, whereby the wheel hub drive system 100 becomes more compact, lighter and more cost effective in design.

In one embodiment (not disclosed) the ring gear 124 of the intermediate planetary gear set 120, is rotationally fixed connected to a stationary part 7 instead of the rim 105 of the wheel, just as the ring gears 114 and 134 of the input planetary gear set 110 and output planetary gear set 130 respectively, which are also connect to a stationary part 7. An exemplary effect of this embodiment is that a higher output torque is acting on the rim 102 of the wheel 10, since the torque from the planet carrier 133 of the output planetary gear set 130 must not counteract the torque from the ring gear 124 of the intermediate planetary gear set 120, which is supported by any stationary part 7 of the wheel hub drive system 100.

The planet carrier 133 of the output planetary gear set 130 is rotationally fixed to the rim 102 of the wheel 10. The ring gear 134 of the output planetary gear set 130 is rotationally fixed to a stationary part 7 of the wheel hub drive system 100.

The rim 102 of the wheel 10 is further connected to a stationary part 7 of the wheel hub drive system 100 through a wheel bearing 150. The wheel bearing 150 is provided in-between the input planetary gear set 110 and the output planetary gear set 130 and comprises an inner and an outer ring 151, 152. The inner ring 151 is rotationally fixed to the stationary part 7 of the wheel hub drive system 100 and the out ring 152 is rotationally fixed to the rim 102 of the wheel 10.

In the space radially inside the inner ring 151 of the wheel bearing 150 a brake 140 is arranged. The brake 140 comprises of a first and a second part 144, 142, where the first part is rotationally fixed to the sun gear 131 of the output planetary gear set 130 and the second part 142 is rotationally fixed to the stationary part 7 of the wheel hub drive system 100. The first and the second part 141, 142 of the brake 140 can be controllable engaged in order to brake the sun gear 131 of the output planetary gear set 130.

As can be seen in FIG. 3 due to that the output planetary gear set 130 is arranged axially in-between the intermediate planetary gear seat 120 and the input planetary gear set 110 a brake 140 the wheel bearing 150 and the brake 140 can be arranged on the same axial position, i.e. the brake 140 inside the wheel bearing 150, whereby both an axial and radial compact wheel hub drive system 100 is achieved.

An exemplary effect of the configuration of the planetary gear sets 110, 120, 130 and the brake 140 and wheel bearing 150 is that a compact design of the wheel hub drive system 100 is achieved.

The invention claimed is:

1. A wheel hub drive system for a wheel of a vehicle, wherein the hub drive system at least comprises: a drive motor with a drive shaft, an input planetary gear set, an output planetary gear set and an intermediate planetary gear set, wherein each planetary gear set at least comprises a sun gear a planet carrier and planet gears provided upon the planet carriers, wherein the drive shaft is arranged rotationally fixed with the sun gear of the input planetary gear set, and the planetary gear sets are arranged such that the planet carrier of the input planetary gear set is rotationally fixed with the sun gear of the intermediate planetary gear set and the planet carrier of the intermediate planetary gear set is rotationally fixed with the sun gear of the output planetary gear set, wherein the planet carrier of the output planetary gear set is adapted to be rotationally fixed with a rim of the wheel, wherein the planetary gear sets are axial arranged in relation to each other such that the output planetary gear set is provided axially in-between the input planetary gear set and the intermediate planetary gear set.

2. The wheel hub drive system of claim 1, wherein the wheel hub drive system further comprises a brake, wherein the brake comprises a first part and a second part, where the first part is rotationally fixed with a stationary part of the wheel hub drive system and the second part is rotationally fixed with the sun gear of the output planetary gear set, wherein the first part and the second part can be controllable engaged such that they are rotationally fixed to each other.

3. The wheel hub drive system of claim 2, wherein the brake is provided axially in-between the input planetary gear set and the output planetary gear set.

4. The wheel hub drive system of claim 3, wherein the wheel hub drive system further comprises at least an inner ring of a wheel bearing, wherein the inner ring is arranged radially outside the brake and upon a stationary part of the hub drive system.

5. The wheel hub drive system of claim 4, wherein the wheel hub drive system further comprises an outer ring of the wheel bearing, such that the wheel hub drive system comprises the wheel bearing and the outer ring is adapted to be rotationally fixed to a rim of the wheel.

6. The wheel hub drive system of claim 1, wherein the intermediate planetary gear set further comprises a ring gear and the ring gear of the intermediate planetary gear set is rotationally fixed with the planet carrier of the output planetary gear set.

7. The wheel hub drive system of claim 1, wherein the output planetary gear set further comprises a ring gear, and the ring gear of the output planetary gear set is rotationally fixed with a stationary part of the wheel hub drive system.

8. The wheel hub drive system of claim 1, wherein the input planetary gear set further comprises a ring gear and the ring gear of the input planetary gear set is rotationally fixed with a stationary part of the wheel hub drive system.

9. The wheel hub drive system of claim 1, wherein the wheel hub drive system further comprises at least one extension shaft coaxial arranged with the drive shaft, wherein the sun gear of the intermediate planetary gear set is provided on the extension shaft.

10. The wheel hub drive system of claim 8, wherein the wheel hub drive system further comprises at least one hollow shaft coaxially arranged with drive shaft and provided around the extension shaft, wherein the sun gear of the output planetary gear set is provided upon the hollow shaft.

11. A wheel comprising a rim and a wheel hub drive system according to claim 1, wherein the rim is rotationally fixed with the planet carrier of the output planetary gear set.

12. A vehicle comprising a wheel according to claim 10.

* * * * *